J. W. SAUERBREI.
CAR FENDER.
APPLICATION FILED OCT. 10, 1919.
1,353,854.
Patented Sept. 28, 1920.
2 SHEETS—SHEET 2.
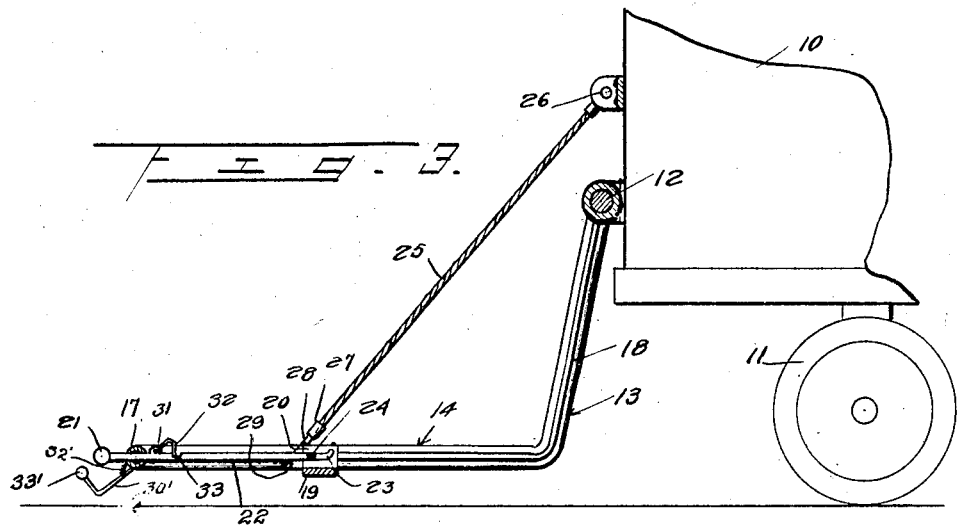
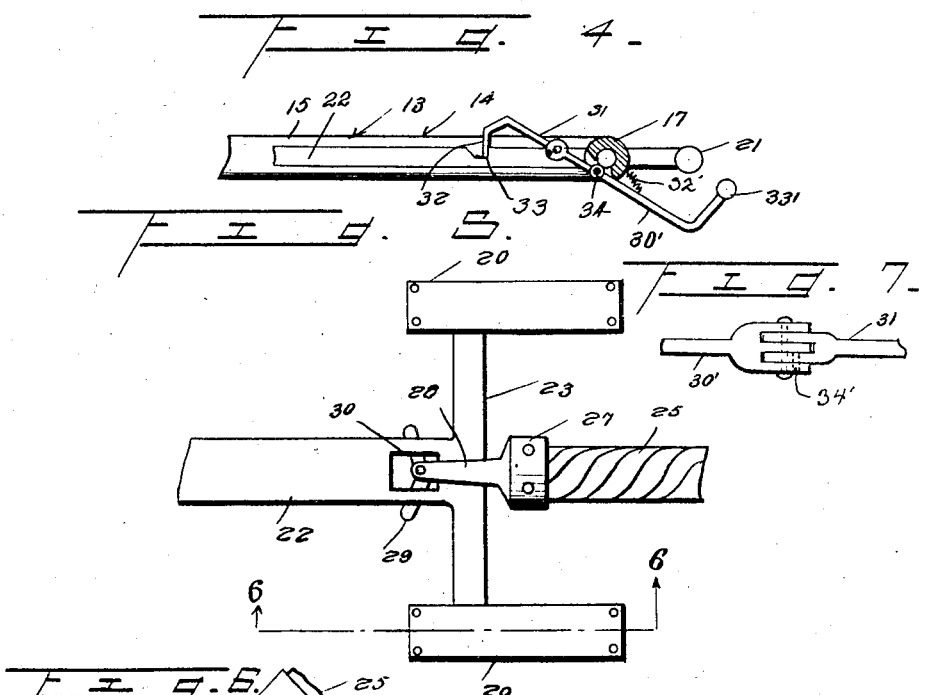
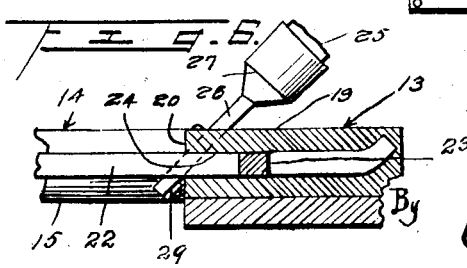
Inventor
J. W. Sauerbrei
Attorney

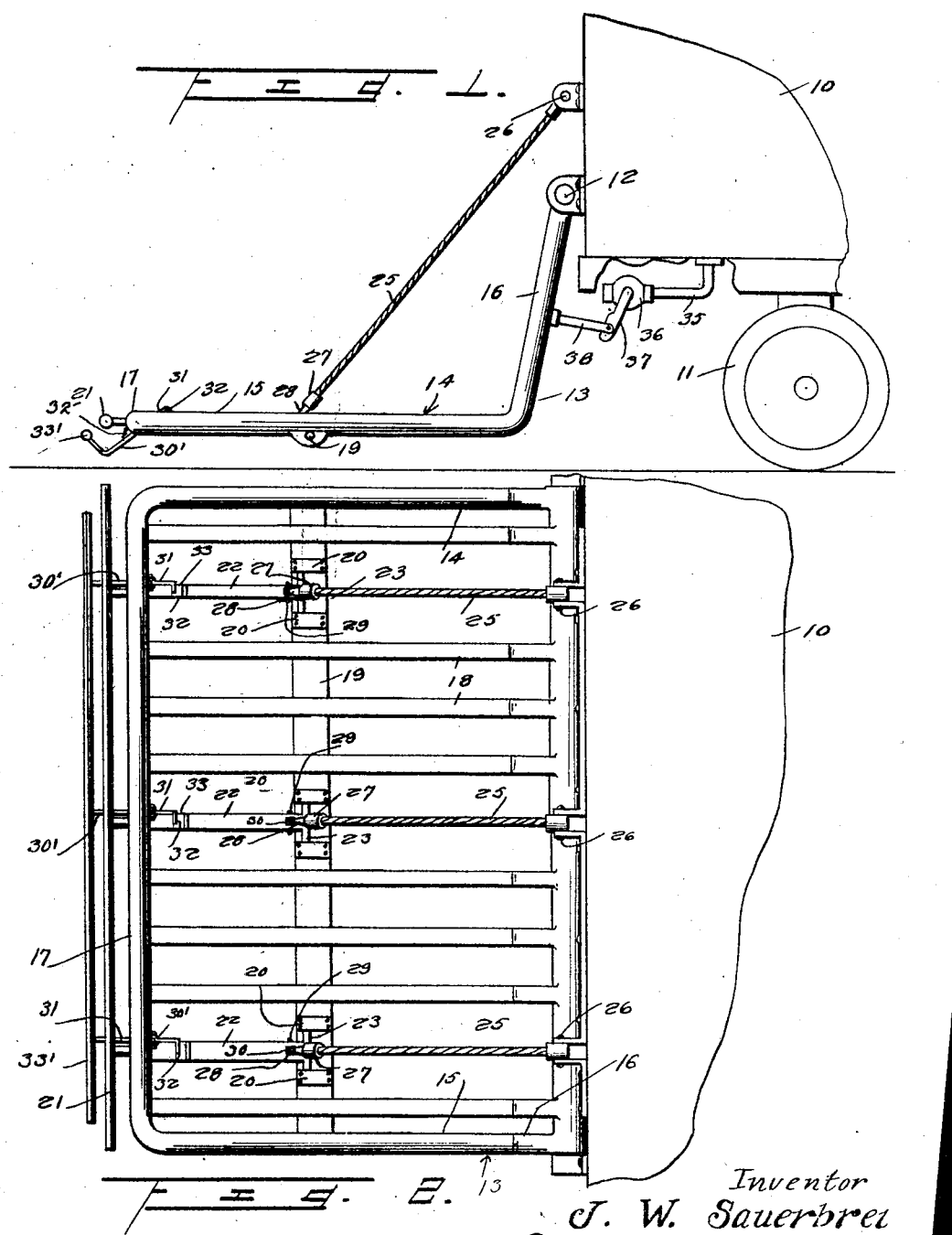

UNITED STATES PATENT OFFICE.

JOHN WILLOUGHBY SAUERBREI, OF KENORA, ONTARIO, CANADA.

CAR-FENDER.

1,353,854.   Specification of Letters Patent.   Patented Sept. 28, 1920.

Application filed October 10, 1919. Serial No. 329,803.

*To all whom it may concern:*

Be it known that I, JOHN W. SAUERBREI, a citizen of Canada, a British subject, residing at Kenora, in the Province of Ontario and Dominion of Canada, have invented certain new and useful Improvements in Car-Fenders; and I do hereby declare the following to be a full, clear, and exact description of the invention, such as will enable others skilled in the art to which it appertains to make and use the same.

My invention relates to improvemenets in car fenders having novel means for stopping the car when the fender engages an obstruction.

An important object of this invention is to provide a car fender having novel means for assuming an operative position upon being engaged by an obstruction.

A further object is to provide a car fender adapted for automatically causing the brakes to immediately stop the car when the fender engages an obstruction.

A further object of this invention is to provide a fender of the character described which will be conveniently and securely attached to cars of standard construction without materially altering the construction of the same.

A further object is to provide a car fender which is simple, efficient and safe in use.

Other objects and advantages of the invention will be apparent during the course of the following description.

In the accompanying drawings forming a part of this application and in which like numerals are employed to designate like parts throughout the same.

Figure 1 is a fragmentary side elevation of a car having my improved fender applied.

Fig. 2 is a plan view of the fender.

Fig. 3 is a vertical section taken on line 3—3 of Fig. 2.

Fig. 4 is an enlarged fragmentary side elevation of the fender.

Fig. 5 is an enlarged fragmentary plan view of another portion of the fender.

Fig. 6 is a section taken on line 6—6 of Fig. 5, and

Fig. 7 is a detail plan view of the hinged connection between the triggers and the releasing arms.

In the drawings, wherein for the purpose of illustration is shown a preferred embodiment of my invention, the numeral 10 generally designates a car mounted on wheels 11 of any desired type. A transverse shaft 12 is carried by the forward portion of the car and pivotally supports a fender generally designated by the numeral 13. The fender 13 includes a rod 14 having horizontal and upright arms 15 and 16 respectively. The horizontal arms are connected by a forward transverse arm 17. A plurality of spaced parallel supporting bars or rods 18 are provided between the sides of the fender and extend for the full length of the same.

As indicated in Fig. 3, the horizontal portion of the fender is provided with a cross head or rod 19 having pairs of spaced guides 20 mounted at intervals thereon.

A transverse bumper rod 21 is arranged forwardly of the fender and is provided with a plurality of rearwardly extending spaced parallel arms 22 having cross heads 23 slidably mounted in slots 24 of the guides 20. A plurality of inclined non-elastic flexible elements 25 are secured as at 26 to the forward portion of the car and are adapted for supporting the horizontal portion of the fender. The lower end portions of the flexible elements which may be of rope, cable or similar material are provided with attaching links 27 having shanks 28 which are provided at their lower end portions with laterally extending fingers 29 extending through apertures 30 in the rear end portions of the arms 22. The bumper member 21 is held in an extended position by a plurality of releasing devices generally designated by the numeral 31'. The releasing devices include arms 31 having triggers 32 pivotally secured thereto which are adapted to seat within recesses 33 in the forward portions of the arms 22.

The triggers are normally held in operative position by contractile coil springs 32' which have one terminal secured to the transverse arm 17 of the fender and their opposite terminals to the arms 31. The triggers are limited in their downward movement by the pin 34', but it will be seen that the arms 31 can be swung upwardly without actuating the triggers.

The forward portions of the arms 30' are provided with trip rods 33' arranged forwardly of the bumper member 21. The arms 31 are pivoted to the fender as indicated at 34. When set, the releasing devices 30' serve to retain the bumper element 21 forwardly with relation to the fender. In locking the arms 22 in a forward position, the fender is retained in a horizontal position. When the releasing devices 30' engage an obstruction, the arms 22 are permitted to move rearwardly with relation to the fender and by reason of the weight of the fender the same will assume a downward position, and pick up any obstructions and prevent the same from coming under the wheels.

The air line 35 of the car is provided with a valve 36 having a usual operating arm 37. The operating arm 37 of the valve 36 is connected to the rearwardly extending rod 38 carried by the rear side of the fender. As is obvious, the air line 35 is connected with the air brakes on the car. When the fender is moved downwardly, the valve 36 is operated and the air is permitted to flow through the air line 35 to the brake operating mechanism for immediately applying the brakes and thereby stopping the car.

While I have shown and described the preferred embodiment of my invention, it is understood that such minor changes in arrangement and construction of parts may be made as will remain within the spirit of the invention and the scope of what is claimed.

Having thus described my invention, what I claim is:

1. The combination with a pivotally supported fender, of a bumper element arranged forwardly of the fender and having a plurality of rearwardly extending arms slidable with relation to the fender, fender supporting means connected to said arms and a releasing device pivotally carried by the fender and extending forwardly of said bumper element and adapted to permit said arms to move rearwardly with relation to the fender.

2. The combination with a pivoted fender, of a bumper element arranged forwardly of the fender and having a plurality of rearwardly extending slidable arms carried by the fender, means to slidably support the rear end portions of said arms, fender supporting members connected to the rear end portions of said arms, and tripping devices carried by the fender and normally retaining said arms forwardly with relation to the fender, said tripping devices being extended beyond the forward side of the bumper element for engaging obstructions.

3. The combination with a pivotally supported fender, of a bumper element arranged forwardly of the fender, arms carried by said bumper and slidable with relation to the fender, supporting means connected with said arms, and a releasing device carried by the fender and extended forwardly thereof to permit said arms of the bumper to move in one direction with relation to the fender.

4. The combination with a pivoted fender, of a bumper element, arms for supporting said bumper element outwardly of said fender, said arms slidable with respect to the fender, means to support one end of said arms, fender supporting means connected with said arms, and tripping mechanism carried by the fender and normally retaining said arms in set position with relation to the fender, said tripping mechanism being extended for engaging obstructions forwardly of the fender.

In testimony whereof I affix my signature in presence of two witnesses.

JOHN WILLOUGHBY SAUERBREI.

Witnesses:
H. P. COOKE,
VERA GAMBLE.